(12) United States Patent
Akimoto et al.

(10) Patent No.: US 12,665,531 B2
(45) Date of Patent: Jun. 23, 2026

(54) MOTOR CONTROL DEVICE

(71) Applicant: KABUSHIKI KAISHA YASKAWA DENKI, Fukuoka (JP)

(72) Inventors: Shinichi Akimoto, Fukuoka (JP); Kazuhiko Hiramatsu, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 184 days.

(21) Appl. No.: 18/292,108

(22) PCT Filed: Jul. 30, 2021

(86) PCT No.: PCT/JP2021/028485
§ 371 (c)(1),
(2) Date: Jan. 25, 2024

(87) PCT Pub. No.: WO2023/007745
PCT Pub. Date: Feb. 2, 2023

(65) Prior Publication Data
US 2024/0396478 A1 Nov. 28, 2024

(51) Int. Cl.
*H02P 6/21* (2016.01)
*H02K 29/08* (2006.01)
*H02P 6/16* (2016.01)

(52) U.S. Cl.
CPC .............. *H02P 6/21* (2016.02); *H02K 29/08* (2013.01); *H02P 6/16* (2013.01)

(58) Field of Classification Search
CPC ...... H02P 6/21; H02P 6/16; H02P 6/22; H02P 6/20; H02K 29/08
See application file for complete search history.

(56) References Cited

U.S. PATENT DOCUMENTS 9,960,717 B2 5/2018 Kaidu
2020/0067432 A1* 2/2020 Herrada ............... H02K 11/215

FOREIGN PATENT DOCUMENTS

CN 110011576 A 7/2019
EP 1507330 A2 2/2005
(Continued)

OTHER PUBLICATIONS

Extended European Search Report issued in corresponding European Patent Application No. 21951942.8 mailed Jun. 23, 2025 (8 pages).

(Continued)

*Primary Examiner* — Muhammad S Islam
(74) *Attorney, Agent, or Firm* — Osha Bergman Watanabe & Burton LLP

(57) ABSTRACT

A motor control device that can use a sensor input circuit that has a low response speed. The motor control device comprises a first magnetic pole position detection unit, a second magnetic pole position detection unit, and a control unit. The first magnetic pole position detection unit detects the pre-rotation position of a magnetic pole of a rotor based on detection results from a magnetic pole sensor. The second magnetic pole position detection unit detects the position of the magnetic pole of the rotor based on the current flowing in a plurality of drive windings that drive the rotor. The control unit performs control that makes the rotor start rotating based on detection results from the first magnetic pole position detection unit and control that makes the rotating rotor rotate based on detection results from the second magnetic pole position detection unit.

12 Claims, 9 Drawing Sheets

(56)        References Cited

FOREIGN PATENT DOCUMENTS

| | | | |
|---|---|---|---|
| JP | 2010-233342 | A | 10/2010 |
| JP | 2013-59258 | A | 3/2013 |
| JP | 2015-122823 | A | 7/2015 |
| JP | 2019-24284 | A | 2/2019 |
| JP | 6901651 | B1 | 7/2021 |

OTHER PUBLICATIONS

Ding, et al: "Starting strategy and self-tuning technology of permanent magnet linear synchronous motor (PMLSM) based on Hall sensor", 2021 13th International Symposium on Linear Drives for Industry Applications (LDIA), IEEE, Jul. 1, 2021 (Jul. 1, 2021), pp. 1-6 (6 pages).
Notice of Reasons for Refusal issued in corresponding Japanese Application No. 2023-538202 mailed Jul. 2, 2024 (10 pages).

* cited by examiner

| MAGNETIC POLE POSITION | - | 0° | - | 30° | - | 60° | - | 90° | - | 120° | - | 150° | - | 180° | - | 210° | - | 240° | - | 270° | - | 300° | - | 330° | - | 360° |
|---|---|---|---|---|---|---|---|---|---|---|---|---|---|---|---|---|---|---|---|---|---|---|---|---|---|---|
| MAGNETIC POLE CHANGING SENSOR | | OFF⇒ON | | ON | | ON | | ON | | ON | | ON | | ON⇒OFF | | OFF | | OFF | | OFF | | OFF | | OFF | | OFF⇒ON |
| MAGNETIC POLE SENSOR Az | | OFF | | OFF | | OFF | | OFF | | OFF⇒ON | | ON | | ON | | ON | | ON | | ON | | ON⇒OFF | | OFF | | OFF |
| MAGNETIC POLE SENSOR Bl | | ON | | ON | | ON⇒OFF | | OFF | | OFF | | OFF | | OFF | | OFF | | OFF⇒ON | | ON | | ON | | ON | | ON |

FIG. 2

MOTOR CONTROL DEVICE

TECHNICAL FIELD

Embodiments of the disclosure relate to a motor control device.

BACKGROUND ART

In the related art, known control devices for a motor such as a permanent magnet synchronous motor include a motor control device that controls a rotation speed by using a magnetic pole position detected by a Hall sensor.

For example, a control method of rotating the motor by using a magnetic pole position detected by a Hall sensor when an acquired rotation speed is equal to or less than a threshold value set in advance and estimating a magnetic pole position in accordance with a back electromotive force when the rotation speed exceeds the threshold value has been proposed (see, for example, Patent Document 1).

CITATION LIST

Patent Literature

Patent Document 1: Chinese Patent Application Publication No. 110011576

SUMMARY OF INVENTION

Technical Problem

Unfortunately, the related art described above needs a sensor input circuit that can respond to a high-speed change of a signal and has room for improvement from the viewpoint of the cost of the motor control device.

An object of an aspect of the embodiments is to provide a motor control device to which an input circuit having a low response speed can be applied as a sensor input circuit.

Solution to Problem

A motor control device according to an aspect of the embodiments includes a first magnetic pole position detection unit, a second magnetic pole position detection unit, and a control unit. The first magnetic pole position detection unit detects a position of a magnetic pole before a start of rotation of a rotor having the magnetic pole in response to a detection result of a magnetic pole sensor. The second magnetic pole position detection unit detects the position of the magnetic pole of the rotor in accordance with a current driving the rotor and flowing through a plurality of drive windings. The control unit performs control of starting rotation of the rotor in response to a detection result of the first magnetic pole position detection unit and control of rotating the rotor after the start of rotation in response to a detection result of the second magnetic pole position detection unit.

Advantageous Effects of Invention

An aspect of the embodiments can provide a motor control device to which an input circuit having a low response speed can be applied as a sensor input circuit.

BRIEF DESCRIPTION OF DRAWINGS

FIG. 2 is a diagram illustrating an example of detection of a magnetic pole position by magnetic pole sensors.

DESCRIPTION OF EMBODIMENTS

Embodiments of the present disclosure will be described in detail below with reference to the accompanying drawings. Note that this invention is not limited to the embodiments described below. In the following embodiments, the same portions are denoted by the same reference signs, and redundant description will be omitted.

1. First Embodiment

Configuration of Motor Control Device

Figure 1:
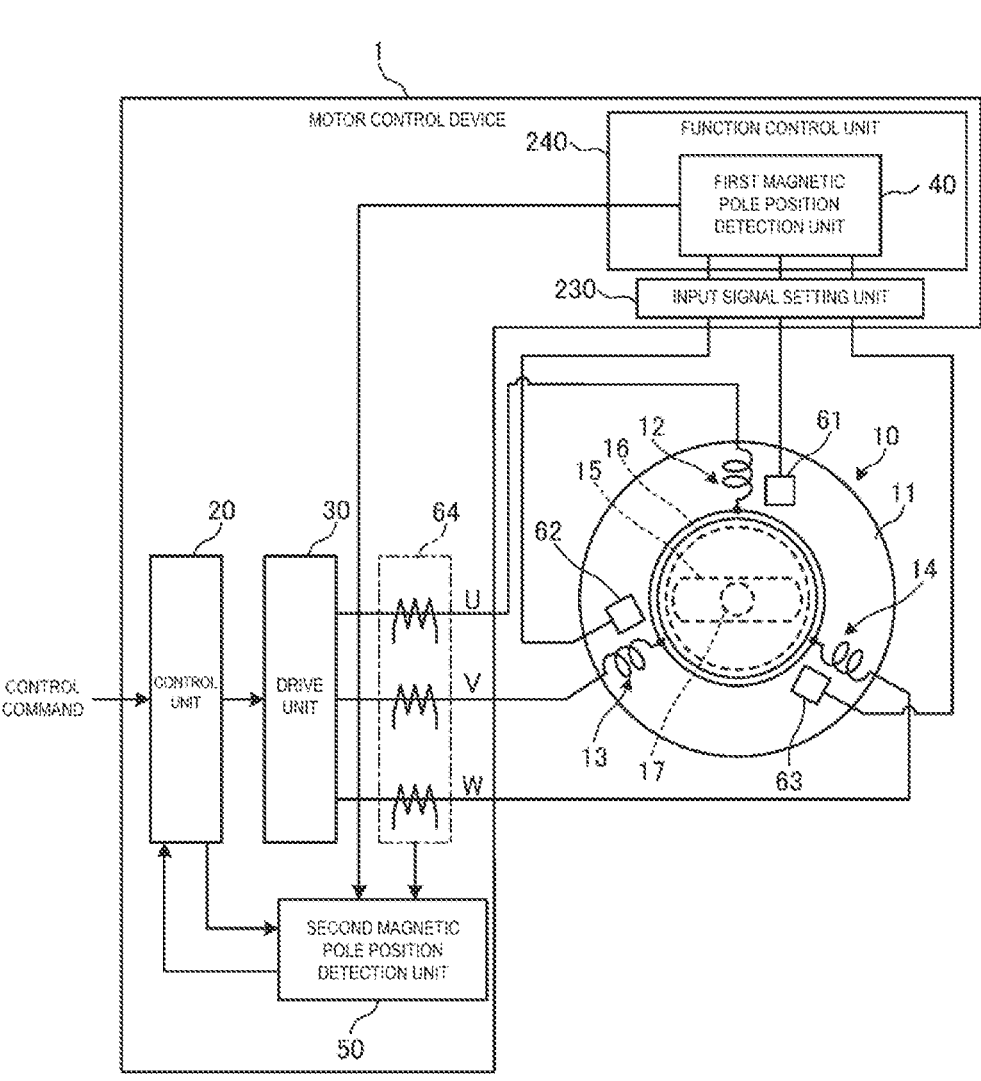
FIG. 1 is a diagram illustrating a configuration example of a motor control device according to a first embodiment.

FIG. 1 is a diagram illustrating a configuration example of a motor control device according to a first embodiment. This figure is a block diagram illustrating a configuration example of a motor control device 1. This figure further illustrates a motor 10.

The motor 10 is a synchronous motor and includes a stator 11 and a rotor 16. The stator 11 includes drive windings 12 to 14 and magnetic pole sensors 61 to 63. The motor 10 in this figure is an example in which a three-phase AC drive voltage is applied to the drive windings 12 to 14 to form a rotating magnetic field. The rotor 16 in this figure includes, for example, a rotation axis 17 and a magnetic pole 15 provided with a permanent magnet or the like extending in a direction parallel to the rotation axis 17, and rotates around the rotation axis 17 in response to the rotating magnetic field formed by the drive windings 12 to 14.

As illustrated in this figure, the drive windings 12 to 14 are connected by a star connection in which respective one ends of the drive windings 12 to 14 are connected in common at the stator 11. The drive windings 12 to 14 may be connected by a delta connection. In this figure, the drive windings 12 to 14 correspond to a U phase which is a first phase of a three phase alternating current, a V phase which is a second phase, and a W phase which is a third phase, respectively. "U", "V", and "W" in this figure represent U-phase, V-phase, and W-phase wirings, respectively. When the motor 10 is driven, a three-phase AC drive voltage is applied to the other ends of the drive windings 12 to 14, whereby a three-phase AC drive current flows. Specifically, a three-phase alternating current flows through the U-phase, V-phase, and W-phase drive windings. This allows a rotating magnetic field to be formed in the motor 10. The rotation direction of the rotor 16 can be changed by reversing the phase sequence of the U-phase, V-phase, and W-phase drive windings to which the drive voltage is applied.

The magnetic pole sensors 61 to 63 are sensors that detect a position of the magnetic pole 15. A Hall sensor can be applied to the magnetic pole sensors 61 to 63. The Hall sensor is a sensor that detects an intensity and a polarity of a magnetic field, generates a signal corresponding to the intensity of a magnetic field formed by the magnetic pole 15 and outputs the signal as a detection result. A plurality of magnetic pole sensors 61 or the like can be arranged in the motor control device 1. This figure illustrates an example in which three magnetic pole sensors 61 to 63 are arranged. Not only can one magnetic pole sensor 61 or the like be disposed for each of the drive windings 12 to 14, but the plurality of the magnetic pole sensors 61 or the like can be disposed at equal intervals between the drive windings 12 to 14. By arranging the magnetic pole sensor 61 or the like in this manner, it is possible to improve the detection accuracy of a position of the magnetic pole 15 of the rotor 16.

The motor control device 1 includes a control unit 20, a drive unit 30, a first magnetic pole position detection unit 40, a second magnetic pole position detection unit 50, and a current sensor 64.

The current sensor 64 detects a current flowing between the drive unit 30 and the motor 10. For example, the current sensor 64 can be configured to detect a current of each phase (the U phase, the V phase, and the W phase) of a three-phase alternating current. For example, the current sensor 64 can be configured to detect currents of any two phases of the three-phase alternating current. Unless zero-phase current is generated, the sum of currents of the U-phase, the V-phase, and the W-phase is zero, and information about currents of all the phases can be obtained even when currents of two phases are detected.

The drive unit 30 is a circuit that supplies a drive current to the drive windings 12 to 14 in accordance with the control of the control unit 20. For example, an inverter circuit in which six switching elements are bridge-connected to the three phases, or a matrix converter circuit in which each line for supplying an input to the drive unit 30 and each line for extracting an output from the drive unit 30 are connected by a bidirectional switch can be applied to the drive unit 30. The switching elements and the bidirectional switches are composed of a semiconductor element such as a power metal oxide semiconductor field effect transistor (MOSFET) or an insulated gate bipolar transistor (IGBT) and are switched on and off in accordance with a drive signal. The drive unit 30 applies a drive voltage to the drive windings 12 to 14 to cause a drive current to flow by switching a plurality of semiconductor elements on and off in accordance with a drive signal input from the control unit 20.

FIG. 2 is a diagram illustrating an example of detection of a magnetic pole position by the magnetic pole sensors. The first magnetic pole position detection unit 40 detects a position of the magnetic pole 15 in response to detection results of the magnetic pole sensors 61 to 63. For example, the magnetic pole sensors 61 to 63 output an ON signal when the N pole of the magnetic pole 15 is closer to the magnetic pole sensor than the S pole of the magnetic pole 15 and output an OFF signal when the S pole is closer to the magnetic pole sensor than the N pole of the magnetic pole 15. The first magnetic pole position detection unit 40 detects a position of the magnetic pole 15, for example, as an electrical angle as described in FIG. 2 based on the states of signals output from the magnetic pole sensors 61 to 63. The first magnetic pole position detection unit 40 can detect a position of the magnetic pole 15 in a state where the rotor 16 is stopped. The first magnetic pole position detection unit 40 can also detect a position of the magnetic pole 15 when the rotor 16 is rotating. FIG. 2 describes, as a magnetic pole sensor changing point, a magnetic pole position at which an output signal of any one of the magnetic pole sensors 61 to 63 changes, which will be described below in the description of a second embodiment.

The first magnetic pole position detection unit 40 of FIG. 1 is disposed in a function control unit 240. The first magnetic pole position detection unit 40 is connected to the magnetic pole sensors 61 to 63 via an input signal setting unit 230. The function control unit 240 and the input signal setting unit 230 will be described below with reference to FIG. 3.

The second magnetic pole position detection unit 50 detects a position of the magnetic pole 15 in accordance with a current detected by the current sensor 64. As described above, when the motor 10 is driven, a three-phase AC voltage is applied to the drive windings 12 to 14, whereby a three-phase alternating current is supplied as a drive current. By detecting the drive current, a position of the magnetic pole 15 can be detected.

As an example, the second magnetic pole position detection unit 50 calculates, in accordance with a voltage command and a detected value of a drive current from the drive unit 30 to the motor 10, a phase error of the voltage command and detects a position of the magnetic pole 15 in accordance with the phase error of the voltage command.

The control unit 20 introduces a $\gamma\delta$ coordinate system which rotates around the rotation axis 17 in synchronization with a frequency command and an $\alpha\beta$ coordinate system which is a fixed coordinate system and generates voltage commands $V\gamma$ and $V\delta$ which are values on the respective axes of the $\gamma\delta$ coordinate system. The voltage commands $V\gamma$ and $V\delta$ are generated in accordance with current commands on a $\gamma$ axis and a $\delta$ axis. The control unit 20 converts a three-phase AC drive current detected by the current sensor 64 into $i\gamma$ and $i\delta$ which are values on the respective axes of the $\gamma\delta$ coordinate system. Next, the second magnetic pole position detection unit 50 calculates, in accordance with the voltage commands $V\gamma$ and $V\delta$, the drive currents $i\gamma$ and $i\delta$, a winding resistance R of the motor 10, and inductances $L\gamma$ and $L\delta$ on the $\gamma$ axis and the $\delta$ axis of the motor 10, components $\varepsilon\gamma$ and $\varepsilon\delta$ on the respective axes of an induced voltage in the $\gamma\delta$ coordinate system by the following equations.

$$\varepsilon\gamma = V\gamma - R \times i\gamma + \omega \times L\delta \times i\delta$$

$$\varepsilon\delta = V\delta - \omega \times L\gamma \times i\gamma - R \times i\delta$$

Further, the second magnetic pole position detection unit 50 calculates a phase error of a voltage command in accordance with a phase of the induced voltage. For example, the second magnetic pole position detection unit 50 calculates a phase angle of a vector of the induced voltage with respect to the $\delta$ axis in the $\gamma\delta$ coordinate system as the phase error of the voltage command. This is based on the fact that when the $\gamma$ axis is oriented in the direction of the magnetic pole 15, the induced voltage is generated only in the $\delta$ axis and a $\gamma$ axis component of the induced voltage becomes zero. The second magnetic pole position detection unit 50 calculates the phase error by the following equation with the rotation direction of the $\gamma\delta$ coordinate system with respect to the $\alpha\beta$ coordinate system as a positive direction.

$$\Delta\theta = -\tan^{-1}(\varepsilon d/\varepsilon q)$$

Next, the second magnetic pole position detection unit 50 calculates an angle difference between the γδ coordinate system and the αβ coordinate system in accordance with an integrated value of a frequency command with a position of the magnetic pole 15 detected by the first magnetic pole position detection unit 40 as an initial value and further calculates an estimated value of a position of the magnetic pole 15 by adding the phase error Δθ to the angle difference. In this manner, the second magnetic pole position detection unit 50 can detect a position of the magnetic pole 15.

The method of detecting the magnetic pole 15 by the second magnetic pole position detection unit 50 is not limited to the above-described method. For example, the second magnetic pole position detection unit 50 may detect a position of the magnetic pole 15 with an observer that receives at least a drive current detected by the current sensor 64 and outputs a position of the magnetic pole 15 and a rotation speed of the magnetic pole 15.

The control unit 20 controls the rotation of the rotor 16 of the motor 10. The control unit 20 generates a drive current command and a frequency command for the motor 10 in accordance with a control command from a host control device or an external setting device, or a control command set for the motor control device 1 as a parameter. Further, the control unit 20 performs control by outputting a drive signal to the drive unit 30 in accordance with the generated drive current command and the generated frequency command. For example, the control unit 20 generates the voltage commands Vγ and Vδ on the γδ coordinate system described above in accordance with the drive current command in order to cause a current corresponding to the drive current command to flow. Furthermore, the control unit 20 transforms the voltage commands Vγ and Vδ into voltage commands on the αβ coordinate system by performing rotational coordinate transformation in accordance with a position of the magnetic pole 15 of the rotor 16.

As the position of the magnetic pole 15, a position of the magnetic pole 15 detected by the first magnetic pole position detection unit 40 in accordance with outputs of the magnetic pole sensors 61 to 63 or a position of the magnetic pole 15 detected by the second magnetic pole position detection unit 50 in accordance with a frequency command and an output of the current sensor 64 is used. Further, the control unit 20 transforms the voltage command on the αs coordinate axis into a drive voltage command by two phase to three phase transformation. This allows, for example, a three-phase AC drive voltage command having an amplitude and a phase for orienting the γ axis to the magnetic pole 15 and obtaining an output of the motor based on the control command to be generated. The control unit 20 further generates a drive signal by, for example, a triangular wave comparison method or a space vector method in accordance with the drive voltage command, and sequentially outputs the drive signal to the drive unit 30 to control the rotation of the rotor 16. A position of the magnetic pole 15 required for generating a drive voltage command is detected by the first magnetic pole position detection unit 40 and the second magnetic pole position detection unit 50. The control unit 20 generates a drive voltage command in response to a detection result of the first magnetic pole position detection unit 40 and performs control of starting the rotation of the rotor 16. The control unit 20 generates a drive voltage command in response to a detection result of the second magnetic pole position detection unit 50 and performs control of rotating the rotor 16 after starting the rotation.

Signal Input Circuit

Figure 3:
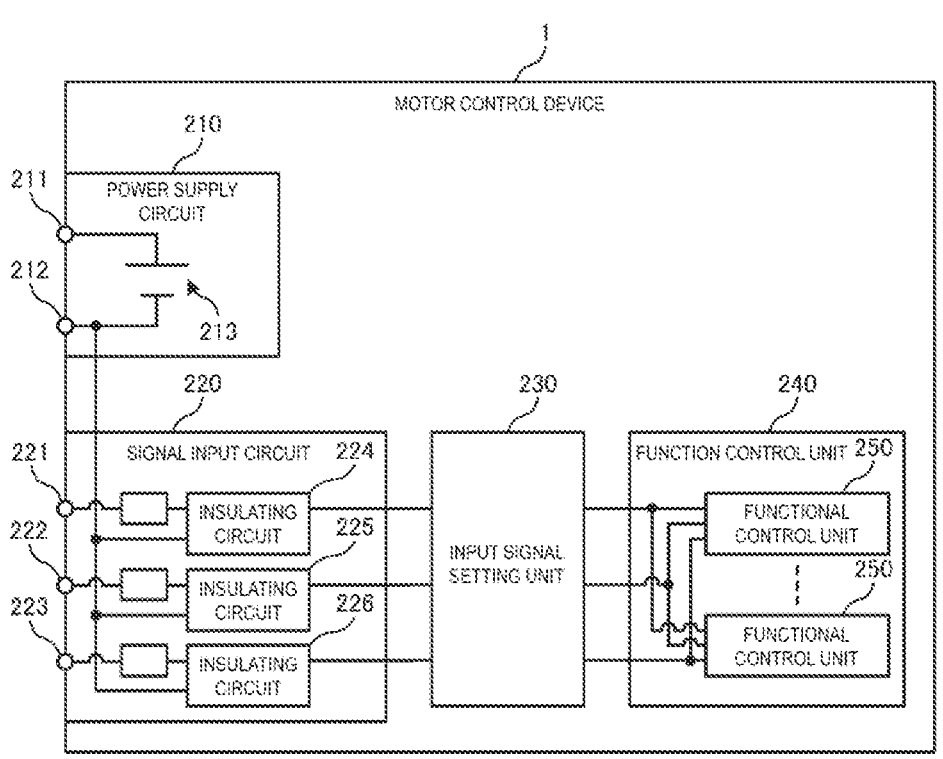
FIG. 3 is a diagram illustrating a configuration example of a signal input circuit included in the motor control device.

FIG. 3 is a diagram illustrating a configuration example of a signal input circuit included in the motor control device 1. A signal input circuit 220 is a circuit that captures an external signal. The signal input circuit 220 in this figure includes terminals 221 to 223 and insulating circuits 224 to 226. This figure illustrates an example in which three signals are captured. The terminals 221 to 223 are terminals to which signal lines of an external device or the like are connected. The insulating circuits 224 to 226 are circuits that electrically insulate and transmit signals. For example, photocouplers can be used in the insulating circuits 224 to 226. The terminals 221 to 223 are connected to the inputs of the insulating circuits 224 to 226, respectively, via load impedances of input circuits represented by rectangles in this figure. Signal commons of the insulating circuits 224 to 226 are commonly connected to a low-potential terminal of a power supply unit 213 to be described below. By providing the signal input circuit 220 having such a configuration, signal lines from the outside can be easily connected.

The output of the signal input circuit 220 in this figure may be input to the input signal setting unit 230. The input signal setting unit 230 sets the usages of input signals connected to the terminals 221 to 223. The input signal setting unit 230 is disposed between the function control unit 240. The function control unit 240 represents an aggregate of functional control units 250 that implement the respective functions included in the motor control device 1. For example, the motor control device 1 can set the contents of signals input from the terminals 221 to 223 to the input signal setting unit 230 by parameters. In this case, the input signal setting unit 230 changes functional control unit 250 of the function control unit 240 to which signals input from the terminal 221 to the terminal 223 are output in accordance with the contents of the signals designated by the set parameters. This allows each of the terminals 221 to 223 to be switched and used for transmission of a plurality of signals having different contents. Note that the input signal setting unit 230 can also output signals input from the terminals 221 to 223 to a plurality of functional control units 250. The first magnetic pole position detection unit 40 described above can be disposed as one of the functional control units 250.

This figure further illustrates a power supply circuit 210 for input and output. The power supply circuit 210 for input and output includes a power supply unit 213 and terminals 211 and 212. The power supply unit 213 supplies, for example, a DC power supply voltage. A high-potential terminal and a low-potential terminal of the power supply unit 213 are connected to the terminal 211 and the terminal 212, respectively. The power supply circuit 210 for input and output can supply power for generating an output signal in an external device via the terminals 211 and 212.

Connection of Signal Input Circuit

Figure 4:
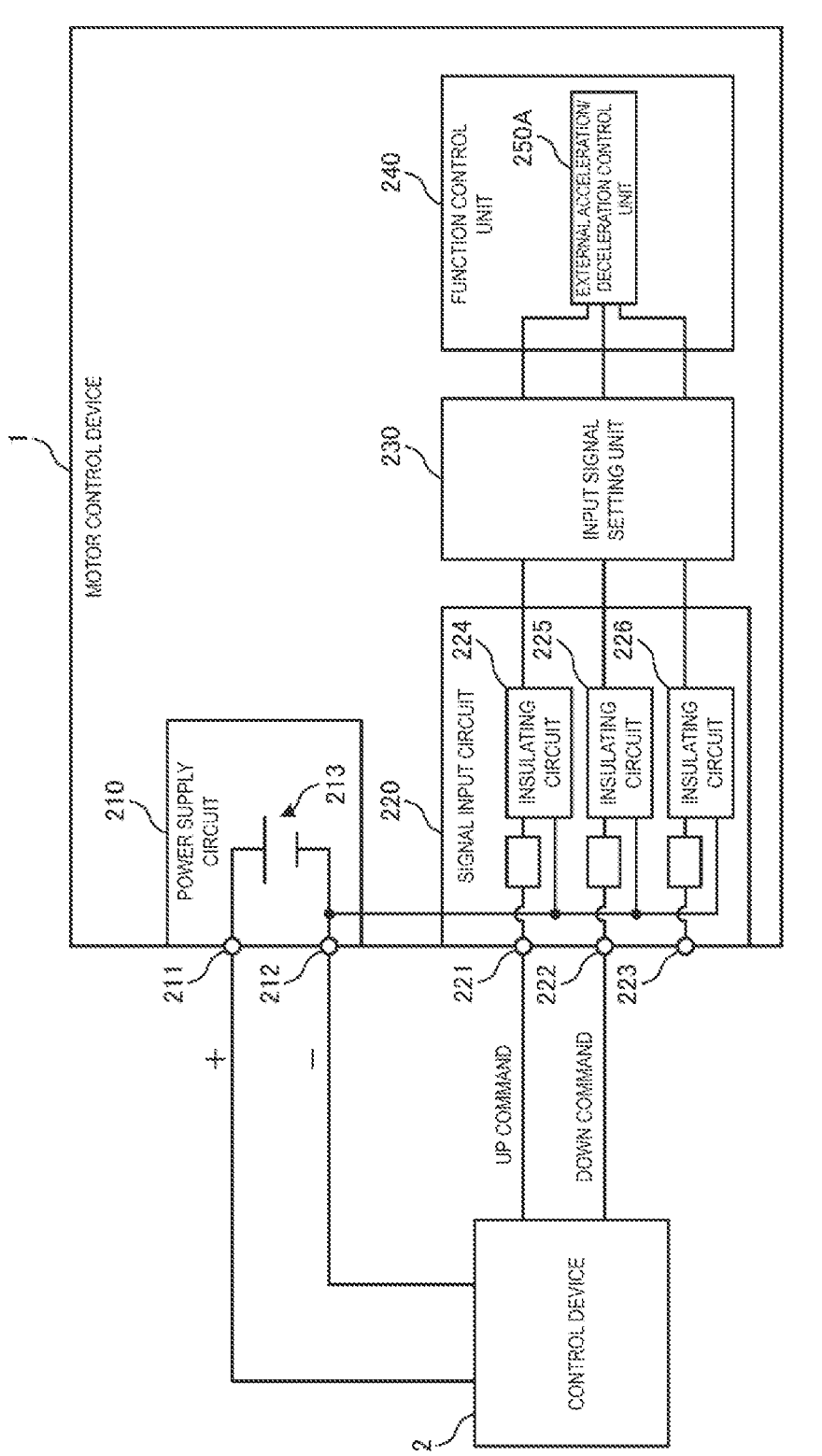
FIG. 4 is a diagram illustrating a connection example of the signal input circuit included in the motor control device.

FIG. 4 is a diagram illustrating a connection example of the signal input circuit included in the motor control device. This figure is a diagram illustrating an example of a case in which a control device 2 is connected to the signal input circuit 220. For example, a sequencer or the like that performs sequence control of the motor control device 1 can be applied to the control device 2. In the example illustrated in FIG. 4, the control device 2 outputs an UP command for increasing the speed of the motor 10 and a DOWN command for decreasing the speed of the motor 10 to the motor control device 1, and signal lines for transmitting these two commands are connected between the control device 2 and the motor control device 1. These lines can be connected to the terminals 221 and 222. Power is supplied to the control device 2 from the power supply circuit 210.

The contents of input signals to the terminal 221 and the terminal 222 are set in the input signal setting unit 230 to be an UP command and a DOWN command, respectively. This allows the input signal setting unit 230 to set an external acceleration/deceleration control unit 250A in the function control unit 240 as an output destination of signals from the terminals 221 and 222. The external acceleration/deceleration control unit 250A increases a speed command for the motor 10 by a certain speed width while an UP command is ON and keeps, when the UP command is turned OFF, the speed command at that time. The external acceleration/deceleration control unit 250A decreases a speed command for the motor 10 by a certain speed width while a DOWN command is ON and keeps, when the DOWN command is turned OFF, the speed command at that time. The external acceleration/deceleration control unit 250A changes a speed command in accordance with an UP command and a DOWN command as described above and outputs the changed speed command to the control unit 20, thereby changing the speed of the motor 10 in accordance with the command from the control device 2.

Connection of Magnetic Pole Sensors

Figure 5:
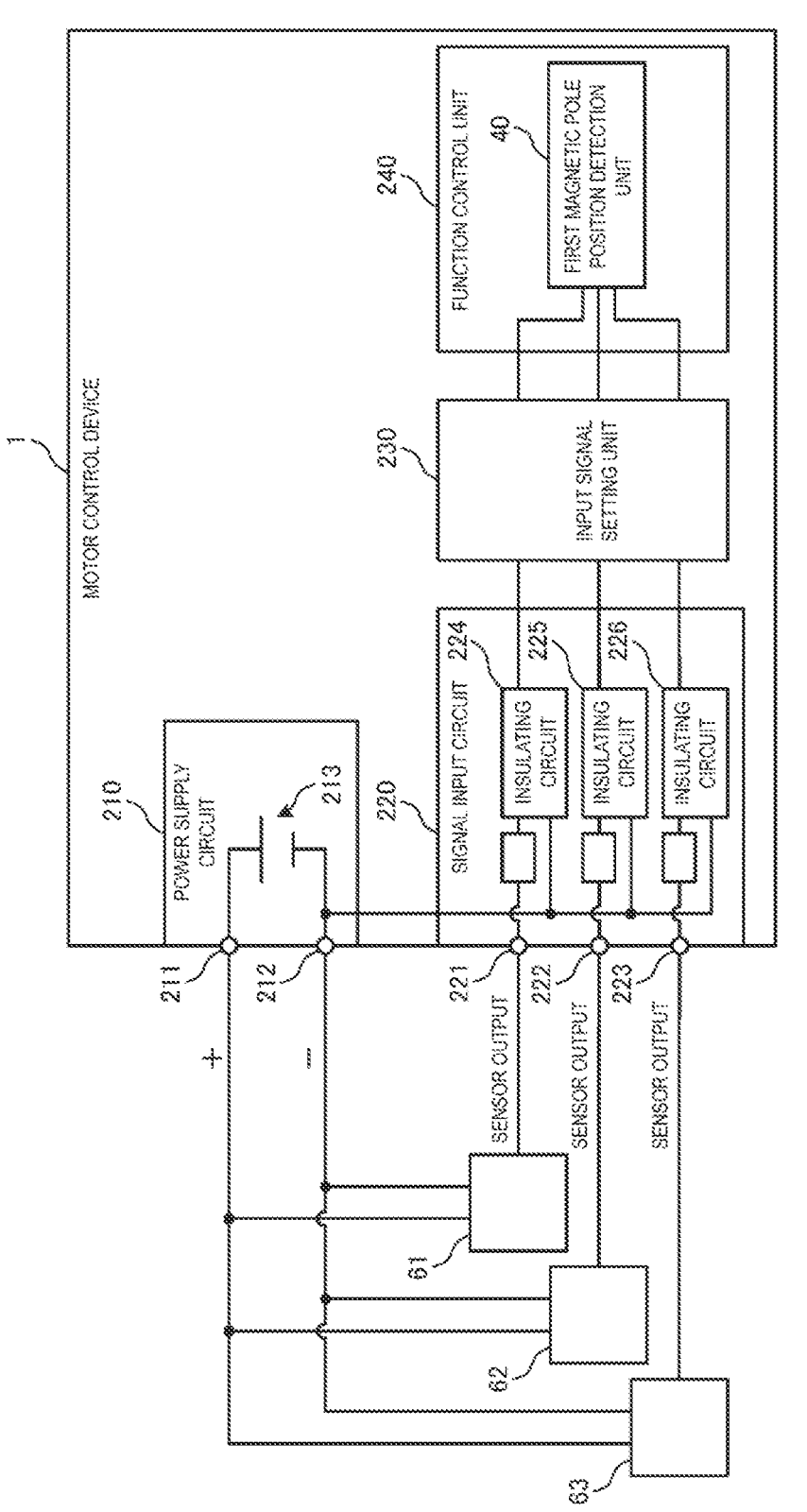
FIG. 5 is a diagram illustrating a connection example of the signal input circuit included in the motor control device according to the first embodiment.

FIG. 5 is a diagram illustrating a connection example of the input circuit of the magnetic pole sensors according to the first embodiment. This figure is a diagram illustrating an example in which the magnetic pole sensors 61 to 63 are connected to the signal input circuit 220. The sensor outputs of the magnetic pole sensors 61, 62 and 63 are connected to the terminals 221, 222 and 223, respectively. Power is supplied to the magnetic pole sensors 61 to 63 from the power supply circuit 210. Specifically, wirings from the terminals 211 and 212 are connected to respective power input terminals of the magnetic pole sensors 61 to 63. This allows power to be commonly supplied to the magnetic pole sensors 61 to 63. For this figure, the content of an input signal from the signal input circuit 220 is set in the input signal setting unit 230 to be a detection result of the magnetic pole sensor 61 or the like. At this time, the input signal setting unit 230 sets an output destination of signals from the terminals 221 and 222 to the first magnetic pole position detection unit 40 corresponding to one of the functional control units 250 in the function control unit 240.

An UP command and a DOWN command from the control device 2 described in FIG. 4 are signals that change at a relatively low speed. The signal input circuit 220 included in the motor control device 1 is typically used to input such a signal and is composed of a circuit having a low-speed response to signal state changes. Thus, it cannot be used as an input circuit for signals from the magnetic pole sensors 61 to 63 that detect magnetic pole positions during rotation of the motor 10. This is because it cannot follow changes in signals. However, in the present invention, the magnetic pole sensors 61 to 63 detect magnetic pole positions when the motor 10 is stopped or rotated at a low speed, and thus signals from the magnetic pole sensors 61 to 63 can be input to the signal input circuit 220.

As described above, the signal input circuit typically included in the motor control device 1 can be used for input of signals from the magnetic pole sensors 61 to 63. Disposing the power supply circuit 210 allows the magnetic pole sensors 61 to 63 and the control device 2 to share a power supply. Accordingly, the hardware resources of the motor control device 1 can be effectively utilized. Disposing the input signal setting unit 230 and setting the usages of input signals can switch between a signal input from an external device such as the control device 2 and a signal input from the magnetic pole sensor 61 or the like by a software method. This can simplify the hardware configuration of the motor control device 1.

As described above, the motor control device 1 according to the first embodiment of the present disclosure can accurately detect a position of the magnetic pole 15 by detecting a position of the magnetic pole 15 of the rotor 16 before start-up using the magnetic pole sensors 61 to 63. Since the magnetic pole sensors 61 to 63 are not used after the start-up, signals from the magnetic pole sensors 61 to 63 can be input to the signal input circuit 220 that is intended for signals whose states changes only at a low speed as compared to the magnetic pole sensors 61 to 63.

2. Second Embodiment

Configuration of Motor Control Device

Figure 6:
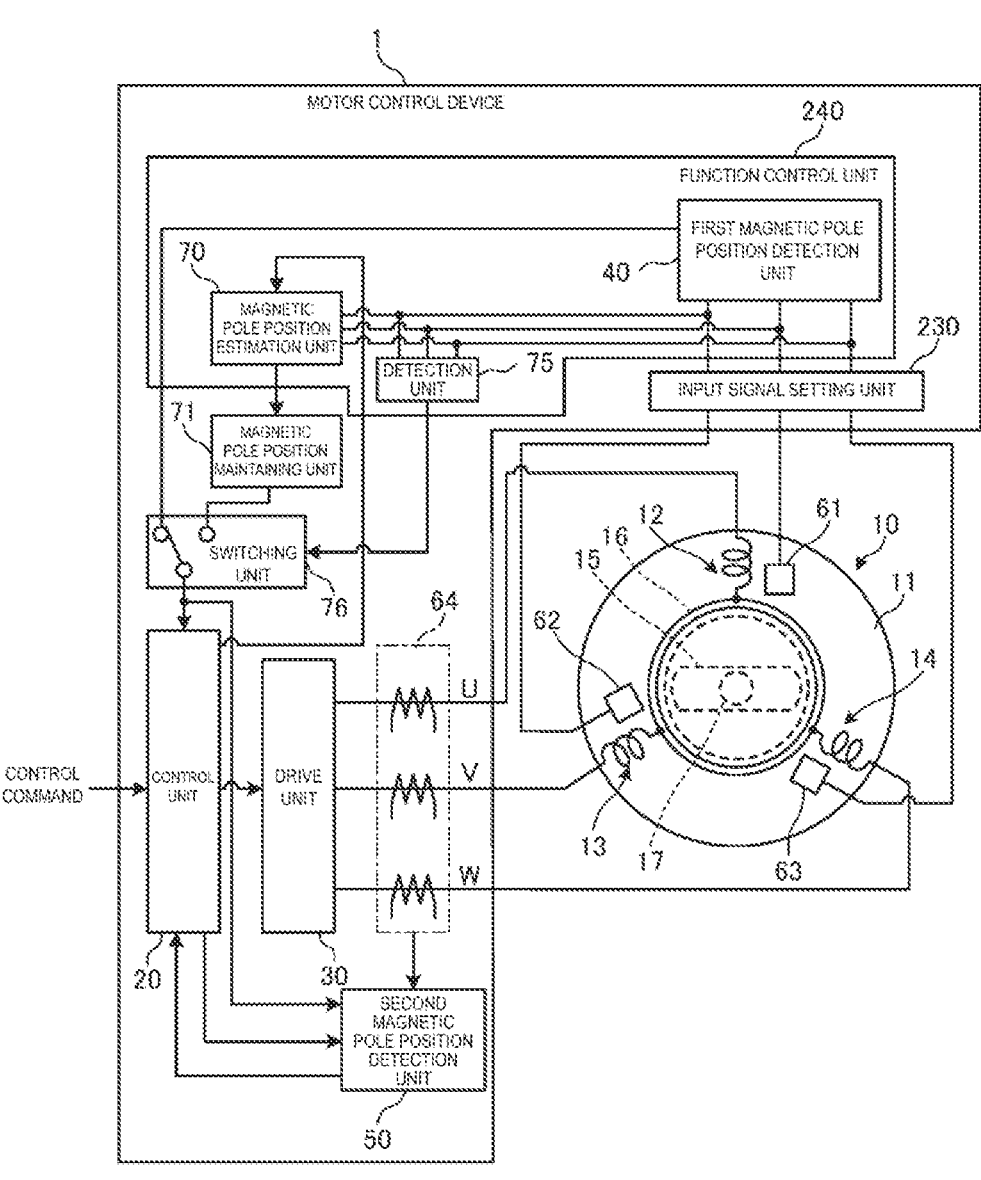
FIG. 6 is a diagram illustrating a configuration example of a motor control device according to a second embodiment.

FIG. 6 is a diagram illustrating a configuration example of a motor control device according to a second embodiment. This figure is, similar to FIG. 1, a block diagram illustrating a configuration example of the motor control device 1. The motor control device 1 in this figure is different from the motor control device 1 of FIG. 1 in that a magnetic pole position estimation unit 70, a magnetic pole position maintaining unit 71, a detection unit 75, and a switching unit 76 are further included.

The magnetic pole position estimation unit 70 estimates a position of the magnetic pole 15 of the rotor 16. The magnetic pole position estimation unit 70 receives inputs of output signals of the magnetic pole sensors 61 to 63 and a speed estimation value from the control unit 20 and estimates a stop position of the magnetic pole 15 when the rotor 16 is stopped. The magnetic pole position estimation unit 70 can employ, for example, a method of estimating, in accordance with a rotation speed of the rotor 16, a stop position of the magnetic pole 15 when the rotation is stopped.

The magnetic pole position maintaining unit 71 maintains a stop position of the magnetic pole 15. The magnetic pole position maintaining unit 71 maintains a position of the magnetic pole 15 estimated by the magnetic pole position estimation unit 70. The position of the magnetic pole 15 that is maintained is output to the control unit 20 when the motor 10 is started next time.

The detection unit 75 detects whether or not there is a change in a value of the magnetic pole sensor 61 or the like while the motor 10 is stopped. After a position of the magnetic pole 15 is estimated by the magnetic pole position estimation unit 70 and maintained by the magnetic pole position maintaining unit 71, when the rotation axis 17 is rotated due to an influence such as an external force, the position of the magnetic pole 15 maintained by the magnetic pole position maintaining unit 71 cannot be used as a position of the magnetic pole 15 before start-up. The detection unit 75 detects such a change in a position of the magnetic pole sensor 61 or the like. The detection result is output to the switching unit 76.

The switching unit 76 switches between an output of the first magnetic pole position detection unit 40 and an output of the magnetic pole position maintaining unit 71 in response to the detection result of the detection unit 75. When the detection unit 75 detects a change in a value of the magnetic pole sensor while the motor 10 is stopped, the switching unit 76 performs control of switching an output of the first magnetic pole position detection unit 40 to an input of the control unit 20. On the other hand, when the detection unit 75 detect no change in a value of the magnetic pole sensor while the motor 10 is stopped, the switching unit 76 performs control of switching an output of the magnetic pole position maintaining unit 71 to an input of the control unit 20. This allows, even when the rotation axis 17 is rotated after a position of the magnetic pole 15 is maintained by the magnetic pole position maintaining unit 71, an output of the first magnetic pole position detection unit 40 to be used as a position of the magnetic pole 15 and an increase of a positional error of the magnetic pole 15 to be prevented.

The magnetic pole position estimation unit 70 and the detection unit 75 each correspond to one of the functional control units 250 illustrated in FIG. 3. The content of an input signal from the signal input circuit 220 is set in the input signal setting unit 230 to be a detection result of the magnetic pole sensor 61 or the like. The input signal setting unit 230 sets the first magnetic pole position detection unit 40, the magnetic pole position estimation unit 70, and the detection unit 75 as output destinations of signals from the terminals 221 and 222.

The control unit 20 in this figure detects a position of the magnetic pole 15 in response to detection results of the magnetic pole sensors 61 to 63 and a position of the magnetic pole 15 maintained by the magnetic pole position maintaining unit 71 and performs control of starting the rotation of the rotor 16 in response to the detection result. Further, the control unit 20 performs control of rotating the rotor 16 after the start of rotation in response to a detection result of the second magnetic pole position detection unit 50.

Estimation of Magnetic Pole Position

Figure 7:
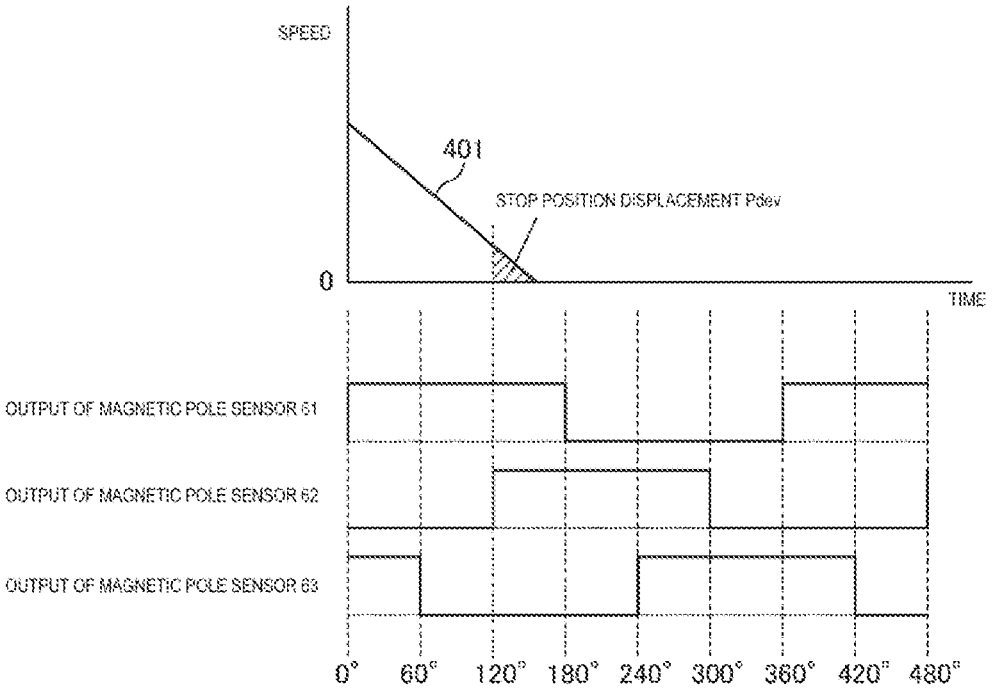
FIG. 7 is a diagram illustrating an example of estimation of a magnetic pole position according to the second embodiment.

FIG. 7 is a diagram illustrating an example of estimation of a magnetic pole position according to the second embodiment. This figure is a diagram illustrating estimation of a position of the magnetic pole 15 of the rotor 16 by the magnetic pole position estimation unit 70. The upper part of this figure is a graph representing the relationship between the rotation speed of the rotor 16 and time. The vertical axis of the graph represents the rotation speed of the rotor 16. The horizontal axis represents time. A graph 401 in this figure represents changes in the speed immediately before the rotor 16 stops. The lower part of this figure illustrates waveforms obtained by binarizing output signals of the magnetic pole sensors 61, 62 and 63 according to an ON state and an OFF state.

As illustrated in this figure, an output of each magnetic pole sensor changes according to a position (angle) of the rotor 16. For example, the magnetic pole position estimation unit 70 acquires a rotation speed estimation value of the rotor 16 from the control unit 20 for each control cycle of the control unit 20 while the rotor 16 is stopped and decelerated. A frequency command value is used as the rotation speed estimation value. In a control cycle (current cycle) in which any one of output signals of the magnetic pole sensors 61 to 63 changes, the magnetic pole position estimation unit 70 calculates a rotation speed change rate based on a rotation speed estimation value in the current cycle and a rotation speed estimation value acquired in the previous control cycle (previous cycle). For example, the magnetic pole position estimation unit 70 calculates a rotation speed change rate α by the following equation.

$$\alpha = (Vpa - Vpr)/Tc$$

Where, Vpr represents the rotation speed estimation value in the current cycle. Vpa represents the rotation speed estimation value in the previous cycle. Tc represents a control cycle time.

Further, the magnetic pole position estimation unit 70 estimates a stop position displacement Pdev corresponding to the area of the hatched portion in the graph representing the relationship between the speed and time in FIG. 7 by the following equation, for example, on the assumption that the rotation speed of the rotor 16 decreases at a constant rotation speed change rate while the rotor 16 is stopped and decelerated.

$$Pdev = Vpr^2/(2 \times \alpha)$$

The stop position displacement Pdev estimated by the above equation is a displacement angle from a position at which any of output signals of the magnetic pole sensors 61 to 63 changes to a stop position of the magnetic pole 15. The magnetic pole position estimation unit 70 repeats the calculation of a stop position displacement Pdev, for example, every time any of the output signals of the magnetic pole sensors 61 to 63 changes. Then, when none of the output signals of the magnetic pole sensors 61 to 63 change within a predetermined time, the magnetic pole position estimation unit 70 determines that the rotor 16 is stopped and determines the stop position displacement Pdev at that time as a final stop position displacement Pdev.

A position of the magnetic pole 15 when any one of the output signals of the magnetic pole sensors 61 to 63 changes can be determined as described in FIG. 2, for example. Thus, the magnetic pole position estimation unit 70 can determine a position of the magnetic pole 15 when any one of the outputs of the magnetic pole sensors 61 to 63 changes in accordance with FIG. 2 by monitoring how the output signal of any one of the magnetic pole sensors 61 to 63 changes (from ON to OFF or from OFF to ON). The magnetic pole position estimation unit 70 calculates an estimated value of a stop position of the magnetic pole 15 by adding a position at which any of the outputs of the magnetic pole sensors 61 to 63 changes to the stop position displacement Pdev. In the example of this figure, the position of the magnetic pole 15 can be estimated to be a position of approximately 150°.

A frequency command value is used as a rotation speed estimation value, but the rotation speed estimation value is not limited to this example. When the second magnetic pole position detection unit 50 includes the observer described above in the description of the first embodiment, a rotation speed of the magnetic pole 15 output by the observer may be used as a rotation speed estimation value.

As described above, the motor control device 1 according to the second embodiment of the present disclosure can improve the detection accuracy of a magnetic pole position by maintaining a position of the magnetic pole 15 of the rotor 16 at stop and applying the position at the next start-up.

3. Third Embodiment

Figure 8:
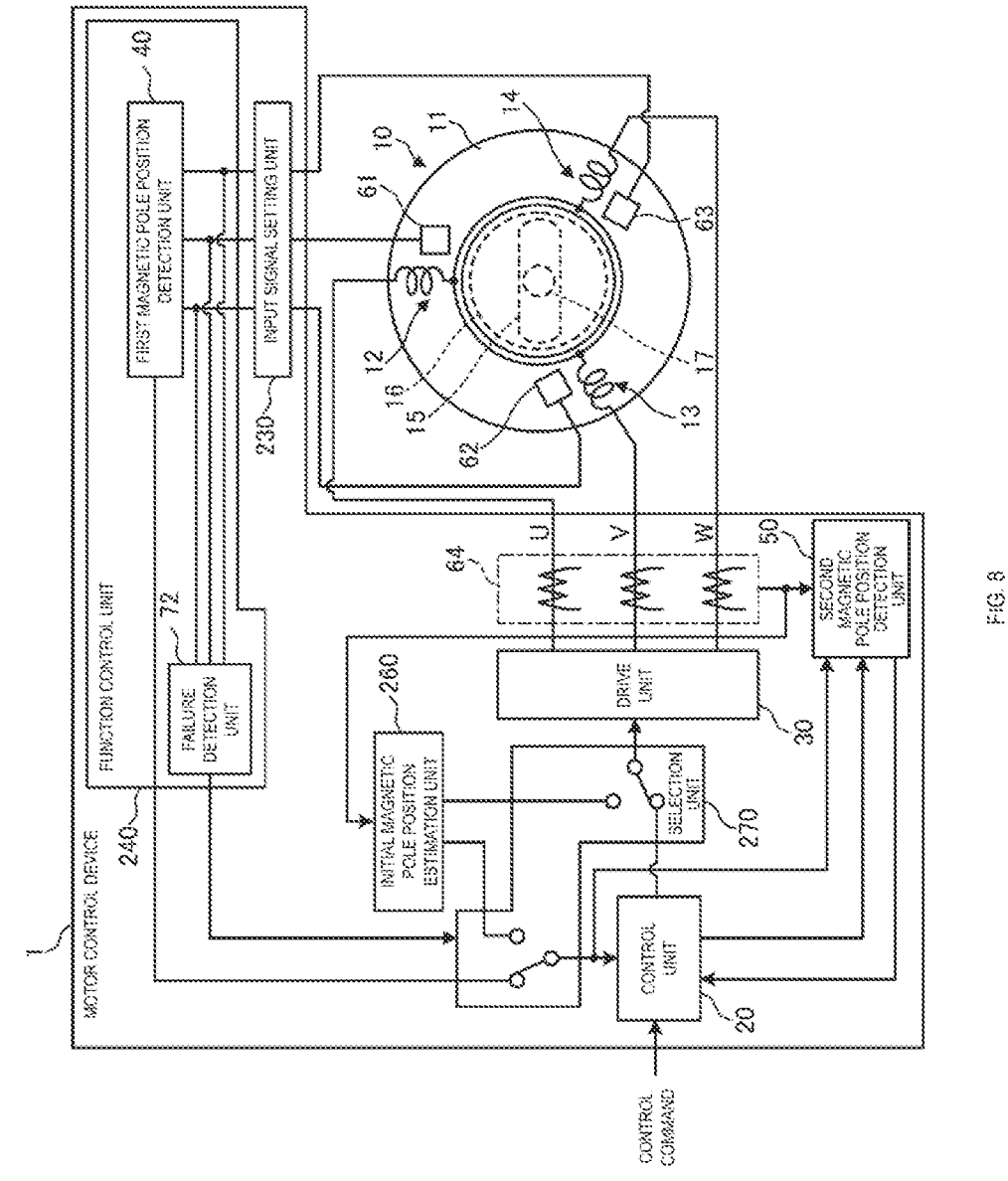
FIG. 8 is a diagram illustrating a configuration example of a motor control device according to a third embodiment.

FIG. 8 is a diagram illustrating a configuration example of a motor control device according to a third embodiment. This figure is, similar to FIG. 1, a block diagram illustrating a configuration example of the motor control device 1. The motor control device 1 of this figure is different from the motor control device 1 of FIG. 1 in that a failure detection unit 72, an initial magnetic pole position estimation unit 260, and a selection unit 270 are further included.

The failure detection unit 72 detects a failure of the magnetic pole sensors 61 to 63. A failure of the magnetic pole sensors 61 to 63 corresponds to disconnection of a signal line or the like. The failure detection unit 72 can detect a failure, for example, by monitoring output signals of the magnetic pole sensors 61 to 63. Specifically, the failure detection unit 72 can detect a failure of the magnetic pole sensors 61 to 63 by detecting that all of the output signals of the magnetic pole sensors 61 to 63 are OFF or ON. When detecting a failure of the magnetic pole sensors 61 to 63, the failure detection unit 72 outputs a magnetic pole sensor failure signal to the selection unit 270.

The failure detection unit 72 corresponds to one of the functional control units 250 illustrated in FIG. 3. The content of an input signal from the signal input circuit 220 is set in the input signal setting unit 230 to be a detection result of the magnetic pole sensor 61 or the like. The input signal setting unit 230 sets the first magnetic pole position detection unit 40 and the failure detection unit 72 as output destinations of signals from the terminals 221 and 222.

The initial magnetic pole position estimation unit 260 estimates a position of the magnetic pole 15 at the start of rotation of the rotor 16 without using the magnetic pole sensors 61 to 63. For example, a method of detecting a position of the magnetic pole 15 of the rotor 16 by a high-frequency superposition method can be applied to the initial magnetic pole position estimation unit 260.

The initial magnetic pole position estimation unit 260 causes the drive unit 30 to supply the motor 10 with a high-frequency search output that the rotor 16 cannot follow. For example, the initial magnetic pole position estimation unit 260 generates a high-frequency search voltage (search output) command instead of the control unit 20 and outputs a drive signal to the drive unit 30 in accordance with the search voltage command. Accordingly, the drive unit 30 applies a search voltage corresponding to the search voltage command to the motor 10. The initial magnetic pole position estimation unit 260 detects at least one position of the magnetic pole 15 in accordance with a search current which is supplied to the motor 10 by the application of the search voltage.

The initial magnetic pole position estimation unit 260 determines, for example, a pulse supply phase in accordance with the detected position of the magnetic pole 15 and causes the drive unit 30 to apply, to the motor 10 at the pulse supply phase, a positive pulse voltage and a negative pulse voltage having such a pulse width that the movement of the motor 10 is limited to a slight movement. At this time, the positive pulse voltage is a pulse voltage having the same phase as the pulse supply phase, and the negative pulse voltage is a pulse voltage whose phase is shifted by 180° from the phase of the positive pulse voltage. The initial magnetic pole position estimation unit 260 evaluates a difference (response difference) between a positive current supplied to the motor 10 in accordance with the positive pulse voltage and a negative current supplied to the motor 10 in accordance with the negative pulse voltage. The positive current and the negative current can be detected by the current sensor 64. For example, the initial magnetic pole position estimation unit 260 can evaluate, as a response difference, a result obtained by subtracting the magnitude of the negative current from the magnitude of the positive current or a result obtained by subtracting a time integral value of the magnitude of the negative current from a time integral value of the magnitude of the positive current. When the sign of the response difference is positive, it can be determined that the N pole is located at the position of the magnetic pole 15 previously detected. On the other hand, when the sign of the response difference is negative, it can be determined that the S pole is located at the position of the magnetic pole 15 previously detected and the N pole is located at a position shifted by an electrical angle of 180°. In this manner, the initial magnetic pole position estimation unit 260 estimates a position of the magnetic pole 15 at the start of rotation of the rotor 16.

When no magnetic pole sensor failure signal is input from the failure detection unit 72, the selection unit 270 selects and inputs, to the control unit 20, the magnetic pole position output from the first magnetic pole position detection unit 40 as a position of the magnetic pole 15 at the start of rotation and selects and inputs, to the drive unit 30, the drive signal output from the control unit 20 as a drive signal. When a magnetic pole sensor failure signal is input from the failure detection unit 72, the selection unit 270 selects and inputs, to the control unit 20, the magnetic pole position output from the initial magnetic pole position estimation unit 260 as a position of the magnetic pole 15 at the start of rotation and selects and inputs, to the drive unit 30, the drive signal output from the initial magnetic pole position estimation unit 260 as a drive signal. Accordingly, when the magnetic pole sensors 61 to 63 fail, the initial magnetic pole position estimation unit 260 operates to detect a position of the magnetic pole 15 at the start of rotation.

As described above, the motor control device 1 according to the third embodiment of the present disclosure can perform alternative detection of a position of the magnetic pole 15 when the magnetic pole sensors 61 to 63 fail. This allows the reliability of the motor control device 1 to be improved.

Figure 9:
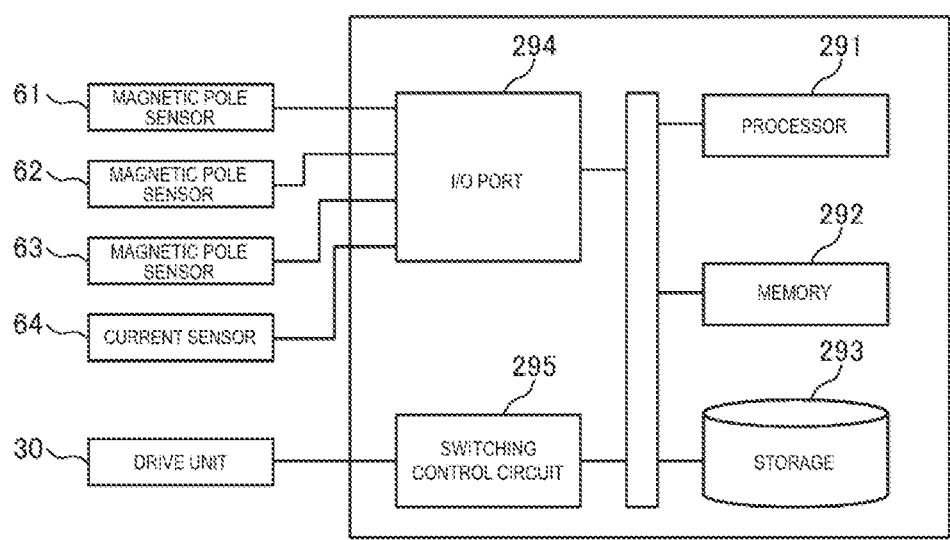
FIG. 9 is a block diagram illustrating a hardware configuration example.

FIG. 9 is a schematic diagram illustrating a hardware configuration example for implementing the first to third embodiments. As illustrated in this figure, hardware for implementing the first to third embodiments includes one or a plurality of processors 291, a memory 292, a storage 293, an 1/O port 294, and a switching control circuit 295. The storage 293 includes a storage medium that can be read by a computer, such as a non-volatile semiconductor memory. For example, the storage 293 stores programs for implementing functional blocks such as the control unit 20, the first magnetic pole position detection unit 40, the second magnetic pole position detection unit 50, the magnetic pole position estimation unit 70, the magnetic pole position maintaining unit 71, the failure detection unit 72, the initial magnetic pole position estimation unit 260, and the selection unit 270.

The memory 292 temporarily stores a program loaded from the storage medium of the storage 293 and a calculation result by the processor 291. The processor 291 implements each of the functional blocks by executing the program in cooperation with the memory 292. The 1/O port 294 inputs and outputs electric signals to and from the magnetic pole sensors 61 to 63, the current sensor 64, and an external device in accordance with a command from the processor 291. The power supply circuit 210 and the signal input circuit 220 constitute part of the I/O port 294. The switching control circuit 295 supplies a drive current to the drive windings 12 to 14 by switching the plurality of semiconductor elements in the drive unit 30 on and off in accordance with a command from the processor 291.

Each of the functional blocks is not necessarily implemented by a program. For example, at least some functions may be configured by a dedicated logic circuit or an application specific integrated circuit (ASIC) integrating the logic circuit.

The effects described herein are illustrative only and are not limited, and there may be other effects as well.

REFERENCE SIGNS LIST

1 Motor control device
10 Motor
11 Stator
15 Magnetic pole
16 Rotor
20 Control unit
40 First magnetic pole position detection unit
50 Second magnetic pole position detection unit
61 to 63 Magnetic pole sensor
64 Current sensor
70 Magnetic pole position estimation unit
71 Magnetic pole position maintaining unit
72 Failure detection unit
75 Detection unit
76 Switching unit
210 Power supply circuit
220 Signal input circuit
230 Input signal setting unit
240 Function control unit
250 Functional control unit
250A External acceleration/deceleration control unit
260 Initial magnetic pole position estimation unit
270 Selection unit

The invention claimed is:

1. A motor control device, comprising:
a processor configured to detect a position of a magnetic pole before a start of rotation of a rotor having the magnetic pole in response to a detection result of a magnetic pole sensor;
a current sensor configured to detect the position of the magnetic pole of the rotor in accordance with a current driving the rotor and flowing through a plurality of drive windings;
a controller configured to perform:
control of starting rotation of the rotor in a first speed range based on a detection result of the processor, and
control of rotating the rotor in a second speed range based on a detection result of the current sensor, wherein the second speed range is faster than the first speed range; and
a signal input circuit configured to connect the processor to the magnetic pole sensor or connect the processor to a signal from outside of the motor control device, wherein
the processor is configured to switch between processing the detection result of the magnetic pole sensor and processing the signal from outside of the motor control device,
a signal state response speed of the signal input circuit is slower than a signal state change of the magnetic pole sensor corresponding to a rotational period of the rotor in the second speed range.

2. The motor control device according to claim 1, wherein the magnetic pole sensor is a Hall sensor.

3. The motor control device according to claim 1, wherein one or more magnetic pole sensors are disposed for each of the plurality of drive windings.

4. The motor control device according to claim 1, wherein magnetic pole sensors are disposed at equal intervals between the plurality of drive windings.

5. The motor control device according to claim 1, wherein
the processor is configured to estimate a stop position of the magnetic pole when the rotor is stopped based on the magnetic pole sensor, and
after the rotor is stopped, the controller is configured to maintain a position of the magnetic pole at the stop position estimated by the processor, and
the controller controls starting rotation of the rotor in accordance with a detection result of the magnetic pole sensor and the stop position.

6. The motor control device according to claim 5, wherein the processor is configured to estimate the stop position of the magnetic pole in accordance with a rotation speed of the rotor.

7. The motor control device according to claim 6, wherein
the processor is configured to detect a change in a value of the magnetic pole sensor while the rotor is stopped,
the motor control device further comprises a switch configured to:
switch between the detected position of the magnetic pole before a start of rotation and the stop position based on the detected change in the value, and
transmit the switched position to the controller, and
the controller is configured to start rotation of the rotor in accordance with the switched position transmitted by the switch.

8. The motor control device according to claim 1, wherein the processor is configured to:
detect a failure of the magnetic pole sensor; and
estimate a stop position of the magnetic pole in response to detecting the failure, wherein
control of starting the rotor is further performed in accordance with the stop position of the magnetic pole estimated by the processor.

9. The motor control device according to claim 1, further comprising:
a signal input circuit configured to input a signal from outside to the controller, wherein
the magnetic pole sensor transmits the detection result to the processor via the signal input circuit.

10. The motor control device according to claim 9, wherein
the processor is configured to set a usage of a signal in the signal input circuit to a usage of position detection of a magnetic pole.

11. The motor control device according to claim 9, further comprising:
a power supply circuit configured to supply power for input and output to the outside, wherein
the magnetic pole sensor is supplied with power for the magnetic pole sensor itself via the power supply circuit.

12. The motor control device according to claim 8, wherein the processor is configured to estimate the stop position of the magnetic pole using a high-frequency superposition method that supplies the motor with a high-frequency search output that the rotor does not follow without using the magnetic pole sensor.

* * * * *